United States Patent
Baumeier

(10) Patent No.: US 7,753,433 B2
(45) Date of Patent: Jul. 13, 2010

(54) RETRACTABLE ROOF DEVICE AND VEHICLE FITTED WITH SAID DEVICE

(75) Inventor: Andreas Baumeier, Bissendorf (DE)

(73) Assignee: Renault S.A.S., Boulogne Billancourt (FR)

( * ) Notice: Subject to any disclaimer, the term of this patent is extended or adjusted under 35 U.S.C. 154(b) by 918 days.

(21) Appl. No.: 10/546,367

(22) PCT Filed: Feb. 18, 2004

(86) PCT No.: PCT/FR2004/000376

§ 371 (c)(1),
(2), (4) Date: Nov. 7, 2006

(87) PCT Pub. No.: WO2004/076214

PCT Pub. Date: Sep. 10, 2004

(65) Prior Publication Data

US 2007/0040410 A1    Feb. 22, 2007

(30) Foreign Application Priority Data

Feb. 21, 2003  (FR) .................................. 03 02155

(51) Int. Cl.
*B60J 7/20* (2006.01)

(52) U.S. Cl. .......................... 296/136.05; 296/136.06; 296/107.08

(58) Field of Classification Search ............ 296/136.05, 296/136.06, 107.08, 136.01, 136.03, 107.01, 296/24.44, 117, 121

See application file for complete search history.

(56) References Cited

U.S. PATENT DOCUMENTS

| | | | | |
|---|---|---|---|---|
| 5,967,593 A | * | 10/1999 | Schuler et al. | 296/136.06 |
| 6,318,792 B1 | * | 11/2001 | Neubrand et al. | 296/107.08 |
| 6,364,396 B1 | * | 4/2002 | Hayashi et al. | 296/136.06 |
| 6,454,343 B1 | * | 9/2002 | Wagner et al. | 296/107.08 |
| 6,619,721 B1 | * | 9/2003 | Langguth et al. | 296/136.06 |
| 6,652,017 B2 | * | 11/2003 | Wagner et al. | 296/107.08 |
| 6,663,163 B2 | * | 12/2003 | Koch | 296/107.08 |
| 6,682,124 B1 | * | 1/2004 | Bohnke | 296/107.08 |
| 7,316,438 B2 | * | 1/2008 | Queveau et al. | 296/24.43 |
| 7,322,635 B2 | * | 1/2008 | Kuttner et al. | 296/107.08 |

(Continued)

FOREIGN PATENT DOCUMENTS

FR    2 839 282    11/2003

(Continued)

OTHER PUBLICATIONS

U.S. Appl. No. 10/546,368, filed Aug. 22, 2005, Baumeier et al.

(Continued)

*Primary Examiner*—Glenn Dayoan
*Assistant Examiner*—Gregory Blankenship
(74) *Attorney, Agent, or Firm*—Oblon, Spivak, McClelland, Maier & Neustadt, L.L.P.

(57) ABSTRACT

A retractable roof device for a vehicle, including a roof panel configured to be displaced by a guide to move from a closed position in the passenger area of the vehicle to a retracted position in a rear area of the vehicle. The device also includes a rear cover structure that includes closing shutters. The closing shutters can be automatically controlled between a position in which they are deployed and a position in which they are stored.

11 Claims, 5 Drawing Sheets

U.S. PATENT DOCUMENTS

| | | | |
|---|---|---|---|
| 7,347,482 B2 * | 3/2008 | Powell | 296/107.08 |
| 7,367,607 B2 * | 5/2008 | Roeder et al. | 296/107.08 |
| 7,419,200 B2 * | 9/2008 | Queveau et al. | 296/24.44 |
| 7,497,500 B2 * | 3/2009 | Roeder et al. | 296/136.05 |
| 2002/0041109 A1 | 4/2002 | Wagner et al. | |
| 2002/0149227 A1 * | 10/2002 | Wagner et al. | 296/107.08 |
| 2003/0020298 A1 * | 1/2003 | Koch | 296/107.08 |
| 2007/0035146 A1 * | 2/2007 | Baumeier | 296/24.44 |
| 2007/0182200 A1 * | 8/2007 | Baumeier et al. | 296/107.08 |

FOREIGN PATENT DOCUMENTS

| | | |
|---|---|---|
| FR | 2 839 475 | 11/2003 |

OTHER PUBLICATIONS

U.S. Appl. No. 10/546,370, filed Aug. 22, 2005, Baumeier.

* cited by examiner

RETRACTABLE ROOF DEVICE AND VEHICLE FITTED WITH SAID DEVICE

BACKGROUND OF THE INVENTION

1. Field of the Invention

The present invention relates to retractable-roof devices and to vehicles equipped with such devices. More particularly, it relates to retractable-roof devices capable of being stored in part of the trunk of a vehicle.

2. Description of Related Art

Such structures and associated mechanisms are described and illustrated in German Patents 4445580 and 4445944. The first patent describes a rigid roof that can be retracted into part of the trunk, this roof being articulated by a quadrilateral articulation system. The second patent describes a trunk door whose mechanism permits opening toward the front for storage of luggage and opening toward the rear to permit the passage of a rigid roof.

The structures illustrated in these patents suffer from several disadvantages, such as the number of parts necessary, which adds restrictive weight and costs and which does not permit reliable repeatability of assembly. The large number of parts used in the different rod assemblies also suffers from a disadvantage in terms of system stability. In addition, these patents do not take into account the problems posed by management of the rear shelf during movement of the roof structure or of the problems of interaction between the vehicle body and the arms of mechanisms passing through this body.

SUMMARY OF THE INVENTION

It is one object of the present invention to offer an improvement of these retractable-roof devices.

The invention also relates to a vehicle equipped with such a device.

BRIEF DESCRIPTION OF THE DRAWING(S)

The present invention will now be described solely by way of example and with reference to the attached figures, wherein.

DETAILED DESCRIPTION OF THE PREFERRED EMBODIMENTS

Figure 1:
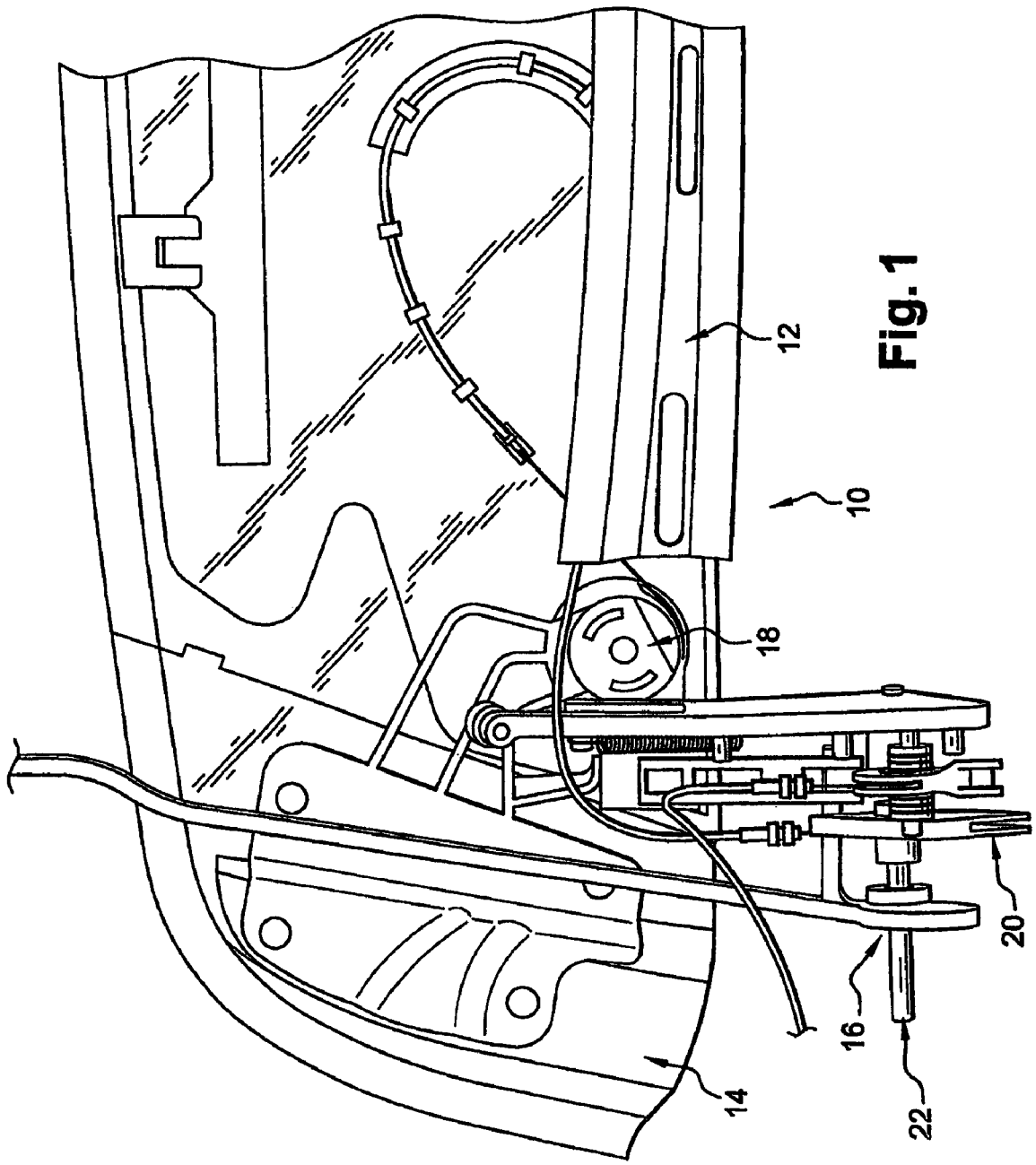
FIG. 1 is a partial view from underneath of a rear shelf with a closure flap in deployed position.
Figure 2:
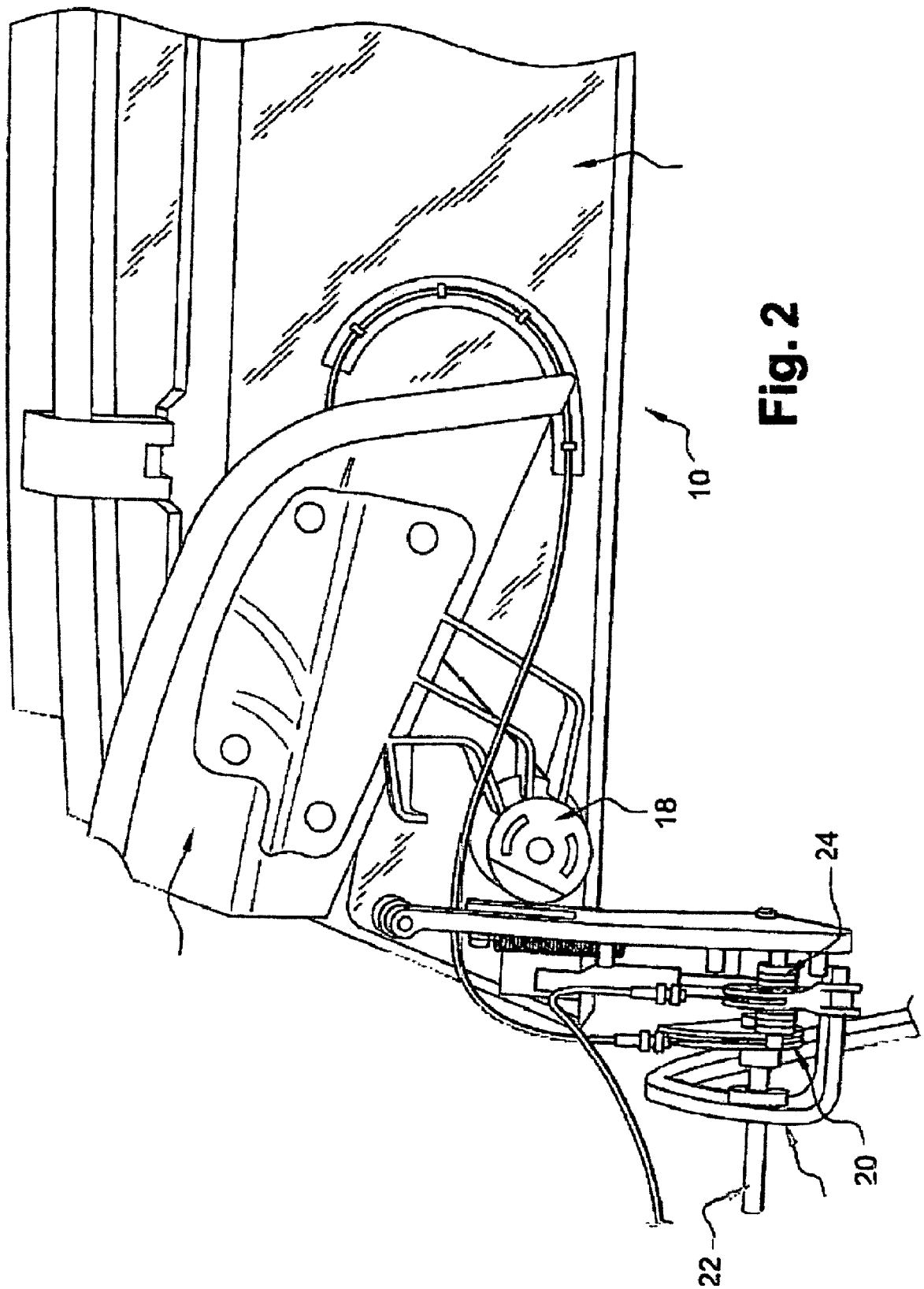
FIG. 2 is a partial view from underneath of a rear shelf according to FIG. 1 with the closure flap in stored position.
Figure 3:
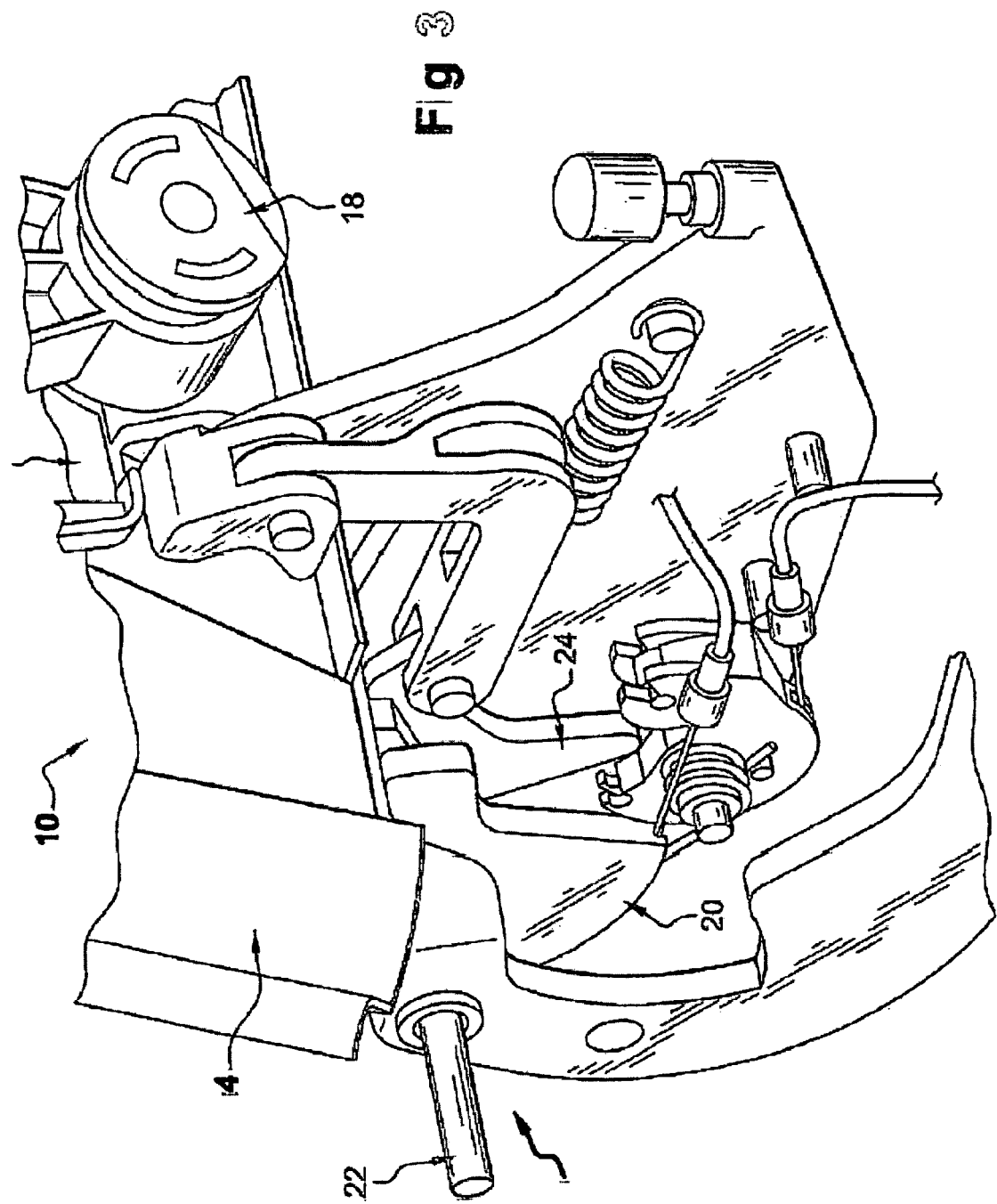
FIG. 3 is a detail view of a mechanism for displacing the closure flap into deployed position.
Figure 4:
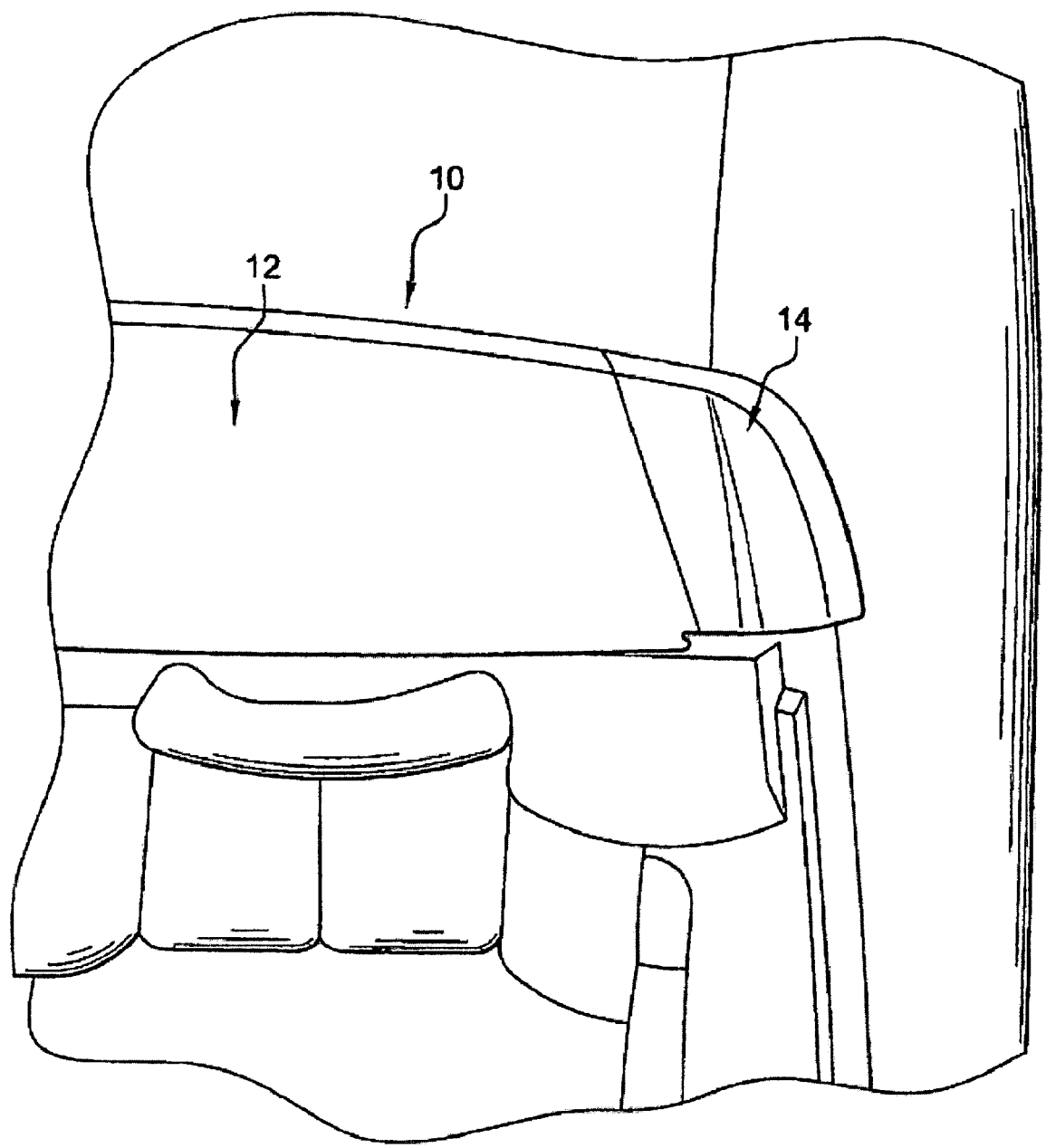
FIG. 4 is a view from above of the shelf and of the closure flap in the deployed position.
Figure 5:
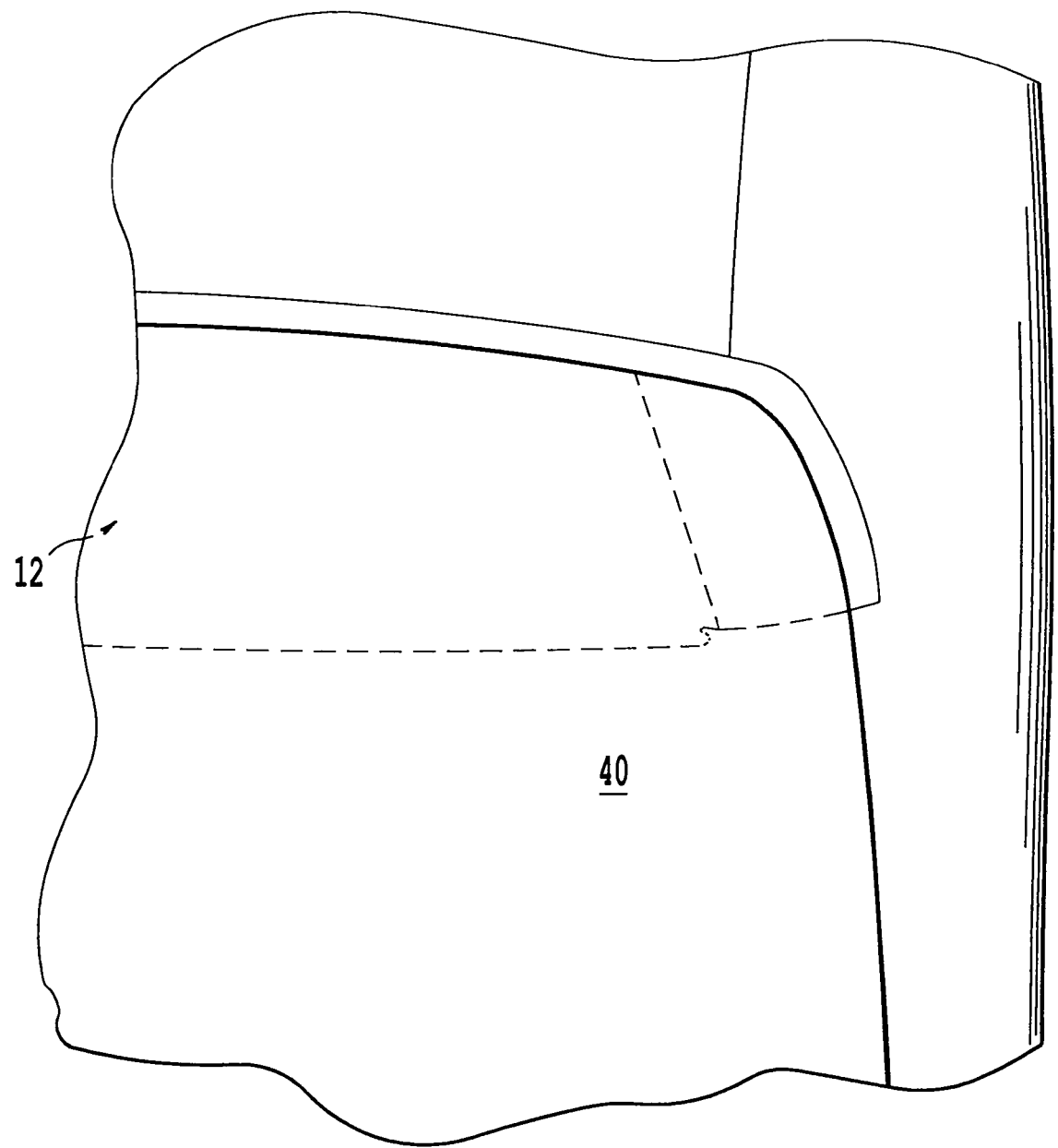
FIG. 5 is a view from above of a roof panel in a closed position in a passenger zone of a vehicle.

Referring to the figures, a vehicle is equipped with a retractable roof or roof panel 40 as shown in FIG. 5. In order to clarify the description hereinafter, the two extreme positions of the roof will be defined.

When the roof panel is resting on the vehicle frame, and in particular on the upper pillar of the windshield, or in other words when the roof is performing a function of covering the passenger compartment formed by the vehicle operator's station and the set of passenger seats, the roof is said to be in closed position.

When the entirety of the roof is lodged in the storage space reserved therefor in the rear of the vehicle, such that the passenger compartment formed by the vehicle operator's station and the set of passenger seats is then uncovered, the roof is said to be in retracted position.

In a configuration with the roof in closed position, a rear cover structure 10 is situated behind the roll bars. Advantageously, it comprises a substantially horizontal rear shelf 12. On both sides of the shelf, transversely relative to the vehicle, arms are deployed to support the roof. In open position, rear shelf 12 is situated in the same substantially horizontal manner behind the roll bars. On both sides of the shelf, transversely relative to the vehicle, in order to conceal the space left unoccupied by the arms that are integral with the roof and that from now on are in the storage space reserved for the roof at the rear of the vehicle, flaps or more specifically closure flaps 14 are displaced from a stored position to a so-called deployed position, ensuring that the unoccupied space is concealed. The presence of such flaps 14 is necessary from an esthetic viewpoint so that the vehicle in open position exhibits a continuous surface, from an aerodynamic viewpoint in order to avoid perturbations in air flow, and also from a viewpoint of sealing of the mechanism present under the shelf.

In order to permit retraction of the roof into the storage space at the rear of the vehicle, rear shelf 12 changes position and shifts successively from an initial position known as rest position and preferably substantially horizontal, to a so-called open position, preferably substantially vertical, in order to make space for the passage of the roof, before finally returning to a substantially horizontal position.

Advantageously, when the roof is in closed position or in retracted position, rear shelf 12 is oriented at an angle to the horizontal plane, in such a way that the rear portion of shelf 12 is lower than the front portion of shelf 12.

The movement of rear shelf 12 during retraction of the roof can take place in the following manner:

In closed position, substantially horizontal shelf 12 is pinched in its rear portion by the rear portion of the roof. When the vehicle operator instructs the roof to open, a control unit actuates a first movement of the trunk door to release the storage space reserved for the roof in the rear portion of the vehicle. While the trunk door continues to pivot toward the rear of the vehicle around a transverse shaft of the vehicle, the roof is caused to move by a hydraulic action of a control lifter. Via a system of cams, the rotary movement of the roof causes a rotary movement of the shelf. In order to permit release of rear shelf 12 from the pinching applied by the roof, rear shelf 12 performs a first rotary movement toward the base of the vehicle, around a transverse shaft of the vehicle. When the rear portion of the roof that was previously pinching the shelf is situated at a vertical level lower than that of the shelf, the shelf performs a second rotary movement, this time toward the top of the vehicle, around the same transverse shaft. This second rotary movement continues until the shelf becomes stopped in substantially vertical position. While the shelf is in this stopped position, the roof continues to be retracted into the storage space reserved for it and from now on causes rotation of closure flaps 14.

The folding down of the shelf then is controlled by the folding down of trunk door. A mechanical cable, such as that used for bicycle brake cables, known by the name Bowden cable, transmits a force generated by the closing mechanism of the trunk door to a device connected to the shelf. When the trunk door is instructed by the control unit to fold down, or in other words while the roof is not yet fully retracted, a simultaneous movement of rear shelf 12 is generated by the cable link, in such a way as to cause rear shelf 12, now inserted between the two closure flaps 14, to return to a substantially horizontal position.

The movement of rear shelf 12 to permit the passage of the roof from a retracted position to a closed position is symmetrically identical. The shelf is first brought into substantially stopped vertical position then restored to substantially horizontal position. These movements are created by the rotation of the roof as it returns to a closed position and by the action of the Bowden cable as it transmits the movements of the trunk door to the shelf.

As seen in the foregoing, when the roof is in retracted position, it is necessary to have closure flaps 14 on both sides of rear shelf 12 for esthetic, aerodynamic and sealing needs. When the roof is in closed position, these same closure flaps 14 cannot be in this position, because they would hinder movement of the arms associated with the roof. In closed position, these flaps 14 are therefore slipped under rear shelf 12. The principle of movement of flaps 14 is as follows:

Flaps 14 remain slipped under shelf 12 when the roof is in closed position and when this roof starts to undergo a rotary movement. They remain slipped into this position until shelf 12 becomes stopped in substantially vertical position. In this position, the rotation of the roof around a transverse shaft of the vehicle causes displacement of flaps 14 by cams. In order to shift from a position slipped under shelf 12 to a position beside shelf 12, while forming a plane with this shelf 12, the movement of flaps 14 must be both a movement of release from under shelf 12 and a translational movement to arrive at the same height as shelf 12. Advantageously, these two movements are achieved simultaneously by a helicoidal rotation. It will be understood that these two movements can be achieved successively by a rotational movement followed by a translational movement, or by two translational movements.

The respective movements of closure flaps 14 and of shelf 12 are therefore generated by a common rotary mechanism based on the initial rotary movement of the roof.

A continuous rotary movement of the roof causes two successive movements, the movement of shelf 12 first and then the movement of closure flaps 14. By virtue of the symmetry relative to the centerline of the vehicle, the mechanism described hereinafter for a left side of the vehicle is the same for the right side.

The continuous rotary movement of the roof is generated by hydraulic control. A lifter composed of a body and piston is articulated on the body, at the end of the lifter body via which the piston emerges. Such an articulation allows movement of the lifter body without too much loss of longitudinal thrust of the piston. This piston movement generates the movement of two rods connected respectively to the free end of the piston. A first rod is integral with the body, ensuring both guidance of the movement of the piston and stability of the latter when it is extended, and a second rod, known as the leverage-reducing rod, mounted to rotate freely around the interior arm of the roof, the arm supporting the roof being situated toward the passenger compartment, ensures that the translational movement of the piston can be transferred to a rotational movement of this interior arm. The leverage-reducing rod pulls the interior arm toward the lifter when the piston is retracted and conversely pushes the interior arm when the piston extends outside the lifter body. Since the lower portion of the interior arm is mounted to rotate around a fixed shaft, known as principal pivot shaft 22, the displacement of the interior arm is therefore a rotational movement around this shaft 22. The set of different pivot joints formed by, among other components, this pivot shaft 22, the pivot points between the structure of the roof and the upper portions of the interior and exterior arms, and a pivot point between the lower portion of the exterior arm and the body form an articulated quadrilateral, whose movement is generated by rotation of the interior arm around principal pivot shaft 22. The mobility of the roof, supported by the articulated quadrilateral, is therefore created by the substantially longitudinal movement of the piston and is effected via a rotation of principal shaft 22.

This principal pivot shaft 22 also carries at least one first pulley 20 having a flange perpendicular to the pivot shaft and a groove around the periphery of first pulley 20. Principal pivot shaft 22 also carries at least one cam 24 having a radial protuberance. At its end, the interior arm extends toward the interior of the vehicle, this extension being parallel to principal pivot shaft 22. The relative position of the different elements carried by principal pivot shaft 22 is such that the interior arm is situated toward the exterior of the vehicle, cam 24 is situated toward the interior of the vehicle and first pulley 20 is situated between the arm and cam 24. The extension of the interior arm parallel to principal pivot shaft 22 therefore intersects the plane of rotation of first pulley 20 and the radial flange of first pulley 20 has a dimension such that it can be in contact with the extension of the interior arm parallel to principal pivot shaft 22.

A substantially L-shaped lever is articulated at one of its ends on cam 24 and has an orifice for passage of the radial protuberance of cam 24 in an extreme position. The other end of the lever is mounted to rotate around a shaft integral with shelf 12.

A second pulley is mounted to rotate around a second pivot shaft carried by a housing, which also carries principle pivot shaft 22. This second pulley has a groove in which a mechanical cable of the bicycle-brake type is inserted. This cable is connected to the opening mechanism of the trunk door.

Cam 24 is connected to one end of a restoring spring, whose other end is integral with the housing. This restoring spring tends to return shelf 12, via cam 24 and the L-shaped lever, to a substantially horizontal position when the second pulley, which blocks the radial protuberance of cam 24, is actuated by the cable of the trunk door. Cam 24 is then released and returns into contact with the extension of the interior arm because of the action of the restoring spring.

The extension of the interior arm has a first and a second surface capable of cooperating simultaneously with a third surface of the flange of first pulley 20 and with a fourth surface of cam 24. These third and fourth surfaces are arranged so that, in a rest position when shelf 12 is lowered and the roof is closed, they are not in a plane parallel to the plane defined by the first and second surfaces of the extension of the interior arm. Cam 24 is therefore offset in rest position relative to first pulley 20, in such a way that, during retraction of the roof and therefore rotation of the interior arm, the second surface of the extension of the interior arm first comes into contact with the fourth surface of cam 24 and at first creates rotation of cam 24 around principal pivot shaft 22. The rotation of this cam 24 causes on the one hand displacement of the L-shaped lever and therefore of shelf 12 into a vertical position, and on the other hand the displacement of the radial protuberance of cam 24, which then becomes engaged in a slot of the second pulley.

While retraction of the roof is continuing, or in other words while rotation of the interior arm around principal pivot shaft 22 is continuing, the first surface of the extension of the interior arm now comes into contact with the third surface of first pulley 20 and creates a rotation of first pulley 20 around principal pivot shaft 22. A cable of the bicycle-brake type is fixed in the groove of this first pulley 20, and the rotation of this first pulley 20 generates a tractive force on this cable, which tractive force acts, at the other end of the cable, on an actuating mechanism 18 of closure flaps 14. This actuating mechanism 18 of closure flaps 14 is fixed to shelf 12 and consists of a shaft integral with shelf 12 and a cylinder carrying closure flap 14. The movement of the cylinder relative to the shaft is a helicoidal rotary movement, which permits release of flap 14 from underneath shelf 12 and at the same time allows flap 14 to be restored to a substantially equivalent vertical level. The helicoidal rotary movement of closure flaps 14 is therefore initiated by the rotation of first pulley 20 carried by principal pivot shaft 12.

It will be understood that the movement of closure flaps 14 begins during retraction of the roof, while shelf 12 is substantially in vertical position. This movement of flaps 14 is ended when the roof is already retracted and the trunk door resumes its initial position. Since the assembly formed by first pulley 20, the intermediate support and cam 24 is stopped against the extension of the interior arm, the return of rear shelf 12 to position is initiated by the start of movement of the trunk door. A cable connects the mechanism of this trunk door to the second pulley and permits release of the radial protuberance of the cam, creating a rotary movement of the second pulley. The movement that is now permitted of cam 24 and therefore of the L-shaped lever allows shelf 12 to be returned to substantially horizontal position. This substantially horizontal position is stopped by the contact of shelf 12 on a pin integral with the housing.

When the vehicle operator instructs the roof to close, the operation takes place symmetrically in the same manner. The opening of the trunk door and the start of movement of the articulated assembly supporting the roof cause the positioning rear shelf 12 into a substantially vertical position and cause release of the stops effected by the first and second surfaces of the extension of the interior arm on the third surface of first pulley 20 and fourth surface of the cam. A spring system placed between the shaft and the cylinder used for the helicoidal rotation of closure flaps 14 then permits, when the pressure exerted by the cable on the cylinder no longer exists, or in other words when first pulley 20 is released following rotation of principal shaft 22, flaps 14 to be returned to position under shelf 12 in order to permit passage of the arms supporting the structure of the roof.

The closed position of the roof, in which the articulated assembly supporting the roof has a lower portion underneath the structure of the body and an upper portion connected to the roof and therefore above this structure of the body, and the retracted position of this roof, in which the articulated assembly is entirely situated underneath the structure of the body, implies the creation of an orifice in the structure of the body to permit passage of the articulated assembly. These orifices cannot be uncovered when the roof is in retracted position, for esthetic, aerodynamic and sealing reasons. Advantageously, the interior arm supporting the roof has an elbowed shape close to its lower end. This elbowed shape is complementary to a cam, belonging to a trapdoor, not illustrated, situated in the structure of the vehicle, in a zone substantially close to shelf 12. When the roof is activated in order to return to closed position, the lower portion of the interior arm once again comes into contact with cam 24 of the trapdoor and creates a rotation of this cam 24 and of an associated plate and therefore opening of the trapdoor. The interior arm and the exterior arm can then pass through this trapdoor in order to support the roof. A restoring spring is connected to cam 24 of the trapdoor, in such a way that, during retraction of the roof, and therefore when the lower portion of interior arm is no longer in contact with the cam, this cam 24 resumes its rest position and causes the trapdoor to shut via return of the plate associated with cam 24 to its rest position.

The present invention also relates to a mechanism of the trunk door. A vehicle whose rigid roof can be retracted into a storage space reserved in the rear of the vehicle must be equipped with a trunk door having special kinematics.

Firstly, the trunk door must permit standard opening, in order to store luggage in the trunk. For this purpose, the trunk door is mounted to rotate around a transverse shaft in the portion of the trunk door situated farthest forward in the vehicle, when this trunk door is in closed position: access to the trunk then takes place, when the trunk door is open, via the rear of the vehicle.

Secondly, when the vehicle operator demands retraction of the roof, the roof becomes stored in a storage space reserved therefor in the zone of the trunk. The trunk door must therefore be opened to allow the roof to pass, and a standard opening does not permit this. The trunk door must then pivot around a second transverse pivot shaft in the portion of the trunk door situated farthest to the rear in the vehicle, when this trunk door is in closed position: access to the trunk then takes place, when the trunk door is open, via the front of the vehicle and therefore permits passage of the roof and its associated mechanism.

The trunk door is caused to move by an assembly of three principal elements, namely a locking device comprising a hinge of "gooseneck" type and two lateral mechanisms disposed symmetrically on each side of the trunk door. Only the lateral mechanism of the left side of the vehicle will be described, since the lateral mechanism corresponding to the right side is symmetrically equivalent thereto.

This lateral mechanism is composed of a mounting plate integral with the body, of an intermediate chassis articulated on this mounting plate, of a first pneumatic system, one end of which is fixed on the mounting plate and the other end of which is connected to the intermediate chassis, and of an articulation system situated between the intermediate chassis and the trunk door and formed by rods and a second pneumatic system. The mounting plate makes it possible to combine, in the same part, different functionalities, such as articulation of the intermediate chassis, immobilizing means offering the possibility of locking this chassis in ready-to-mount position, the fixation of the first pneumatic system actuating the movement of the intermediate chassis. This mounting plate is made of relatively lightweight material, has small thickness and can advantageously be of triangular shape.

The intermediate chassis itself is made in one piece, having substantially "double-L" shape. A first portion, known as the articulation portion, is mounted on the mounting plate by a pivot joint around a shaft substantially transverse relative to the vehicle and perpendicular to the plane of the mounting plate. This first articulation portion also carries the free end of the first pneumatic system, the translational movement of the piston generating, via this freely pivotal joint and the point of articulation of the chassis on the mounting plate, a rotary movement of the intermediate chassis around a shaft transverse relative to the vehicle and perpendicular to the plane of the mounting plate. The intermediate chassis has a first elbowed portion that connects the first articulation portion to a second portion, known as the transfer portion. This second transfer portion and the first articulation portion are substantially at right angles. At the other end of the second transfer portion, a second elbowed portion is prolonged by a third portion, known as the support portion, substantially parallel to the first articulation portion. This third support portion has different articulation points, on which there are fixed the different rods of the articulation system, which system is situated between the third support portion of the intermediate chassis and a support plate integral with the trunk door. The free end of the piston of the second pneumatic system is also fixed on the third support portion of the chassis, the body of the lifter of the second pneumatic system being connected to the support plate integral with the trunk door.

During a traditional opening of the trunk door for storing of luggage, the piston of the second pneumatic system, compressed when the trunk door is closed, extends as soon as the lock of the trunk door is unlocked. The extension of this piston then creates opening of the trunk door, accompanied by the rods of the articulation system connected to the third support portion of the intermediate chassis. In such an opening, the intermediate chassis does not shift and remains fixed relative to the mounting plate because of the action of immobilizing means mounted on this mounting plate. A pin mounted on the chassis, for example at the level of the second curved portion, may have for this purpose a shape complementary to a system of hooks of immobilizing means. In this position, known as the rest position, the arrangement of the assembly formed by the mounting plate and the chassis is such that advantageously the first articulation portion and the third support portion of the intermediate chassis are substantially oriented horizontally and the second transfer portion is substantially oriented vertically. In order to ensure that the chassis catches in the lock in order to return to a rest position, a pulley can be fixed on the intermediate chassis and be used as guide by virtue of the fact that it is complementary relative to a groove made on the mounting plate. Advantageously, this pulley/groove assembly is constructed at those ends of the mounting plate and of the chassis that are remote from their common articulation point.

The chassis must catch securely on the mounting plate in order to ensure that the opening of the trunk door for storage of luggage takes place via an articulation based on a substantially horizontal and rigid structure. It is also advantageous for the manufacturer during assembly of the vehicle, because the assembly formed by the mounting plate and the chassis caught in the lock can in this way be supplied ready to mount without exhibiting any dispersion as regards installation on each vehicle. The repeatability that such a system exhibits then offers time savings and installation quality that are advantageous for the manufacturers.

During the opening of the trunk by rotation of the trunk door around the second transverse pivot shaft in the portion of the trunk door situated farthest to the rear of the vehicle, or in other words during the opening of the trunk door to permit retraction of the roof, the intermediate chassis is released from the lock of the mounting plate. The first pneumatic system is fixed on the mounting plate, advantageously in the lower part of this mounting plate, the free end of the piston being connected to the intermediate chassis as described in the foregoing. The piston of the first pneumatic system, compressed when the intermediate chassis is in a rest position, extends as soon as the lock of the mounting plate no longer retains the pin of the intermediate chassis. The extension of this piston, then its actuation by hydraulic pressure, then creates rotation of the intermediate chassis around a pivot shaft perpendicular to the mounting plate and therefore substantially parallel to the transverse second pivot shaft. In this configuration, the actuation of the second pneumatic system, situated between the third support portion of the chassis and the support plate integral with the trunk door, is such that the second pneumatic system remains compressed. The rods of the articulation system situated between the third support portion of the intermediate chassis and the support plate integral with the trunk door remain at rest and do not articulate in this case. The system transmits the rotary movement of the intermediate chassis to the trunk door, which undergoes a rotary movement around a transverse shaft belonging to the trunk door and different from the intermediate chassis.

This rotary movement is performed around a transverse shaft, which advantageously passes through the lock of the trunk door. This lock therefore has a special structure in order to take into account the opening of the trunk around this second transverse pivot shaft passing through the lock and to avoid generating force in the lock, which would be the case with a traditional lock and a trunk door that shifts while remaining caught. This lock is based on a structure formed advantageously from two parts, a fixed casing integral with the structure of the body of the vehicle and a hinge of gooseneck type, which travels in a slide of the casing. The curved shape of the slide and the corresponding shape of the hinge generate a movement of this hinge equivalent to a rotary movement around a transverse shaft comparable to the second transverse pivot shaft around which the trunk door rotates. The upper part of the gooseneck hinge carries the catch and bolt of the lock, which will correspond to a zone arranged in the lower portion of the trunk door. By virtue of the curved connection between the casing and the hinge, the two elements of the lock carried both by the body and the trunk door can be inclined in coordinated manner. The movement of the gooseneck hinge corresponds to the movement of the trunk door in smaller proportions. This combination of movements permits a rotary movement of the trunk door without generating force on the lock in contact with this trunk door.

The opening of the trunk door for retraction of the roof is therefore based, among other factors, on two lateral systems and one lock system provided with a gooseneck hinge, which systems are independent. In each of the lateral systems, the intermediate chassis is formed in one piece, which provides savings of parts and therefore of weight and money, and a better stability of each lateral system. Synchronization of the movements of the two lateral systems is achieved by transmission of a pressure-equivalent control signal to the first pneumatic systems. Such synchronization thus makes it possible to operate without a mechanical appendage connecting the two lateral systems. It is to be noted that the trunk door may advantageously have a predetermined flexibility in order to adapt to the movements of the independent lateral systems.

Installation of the mechanisms of the roof and of the trunk door on the vehicle can be achieved as follows. The substructure of a vehicle, or in other words the totality of the structures of the body of the vehicle other than opening members and roof, arrives on an assembly line. A first assembly formed, among other components, by the mounting plate and the intermediate chassis, clipped onto the mounting plate, is installed on the side faces inside the trunk zone. This assembly also contains the second pneumatic system and the articulation system formed by rods, as well as the support plate intended to be made integral with the trunk door. The whole is delivered to the assembly line together with the mounting plate and chassis clipped together, the articulation system being folded up and the second pneumatic system being connected at the level of its lifter body to the support plate and at the level of the end of its piston also being clipped to the support plate. This piston end is intended to be fixed to the third support portion of the intermediate chassis at the end of installation. At first it is clipped onto the support plate to facilitate manipulation by the line operator, after which it is unclipped and positioned on the chassis as soon as the lateral opening members are installed. It is to be noted that the fact that the mounting plate/chassis assembly arrives clipped together on the assembly line makes it possible to fix the assembly without dispersion between one installation and another. The support plate is then made integral with the trunk door when this arrives on the assembly line. The mechanism of the trunk door is then almost installed. Only the first pneumatic system, which must be installed between the first articulation portion of the chassis and the mounting plate, is missing. This first pneumatic system is delivered to the assembly line together with the roof. In fact, the roof is delivered to the assembly line together with at least the hydraulic distribution box, the left and right first hydraulic systems, shelf 12, closure flaps 14 and the mechanism associated with this shelf 12 and these flaps 14. The fact that a hydraulic assembly is delivered in this way as a unit permits the line operator to achieve easier installation of the hydraulic cables. Once the roof is in place, all that is left for the line operator is to fix the hydraulic distribution box in the trunk and to connect it to a control unit, so that the hydraulic pressure control signals necessary to bring about movement of the mechanisms of the roof and of the trunk can be transmitted from the control unit to the pneumatic systems. The line operator must also fix the first pneumatic system between the chassis and the mounting plate, by fixing the lifter body on the mounting plate, advantageously in the lower portion of this mounting plate, and by installing the free end of the piston to rotate on the first articulation portion of the chassis. By means of a cable of the bicycle-brake type, the line operator must also connect the mechanism of the trunk door and the mechanism of shelf 12 delivered together with the roof. Synchronized actuation of the opening of the roof and of the trunk door is ensured, among other features, by this connection.

TABLE OF REFERENCE NUMERALS
ACCORDING TO FIGS. 1 TO 4

10 Rear cover structure
12 Rear shelf
14 Closure flaps
16 Guide device
18 Actuating mechanism of the closure flaps
20 First pulley
22 Principal pivot axis
24 Cam

The invention claimed is:

1. A retractable-roof device for a vehicle, comprising:
a roof panel configured to be displaced by a guide from a closed position in a passenger zone of the vehicle to a retracted position in a rear zone of the vehicle; and
a rear cover structure including closure flaps,
wherein the closure flaps are configured to be actuated automatically with a helicoidal rotary movement between a deployed position and a stored position by a force transmitted through a cable.

2. The device according to claim 1, wherein the closure flaps are further configured to be actuated toward the deployed position during movement of the roof panel toward the retracted position.

3. The device according to claim 1, wherein the closure flaps are further configured to be actuated toward the stored position during movement of the roof panel from the retracted position toward the closed position.

4. The device according to claim 1, wherein the helicoidal rotary movement toward the stored position comprises a movement directed toward an interior.

5. The device according to claim 4, wherein the helicoidal rotary movement is around a shaft oriented substantially perpendicular to each of the closure flaps, and the closure flaps are further configured to move between substantially orthogonal planes when they are actuated between the deployed position and the stored position.

6. The device according to claim 1, further comprising:
a rear shelf,
wherein the rear shelf is superposed at least partly with the closure flaps which are slipped above the shelf, and the rear shelf is configured to rotate in synchronization with the closure flaps.

7. The device according to claim 6, wherein the closure flaps are substantially rigid and contact the rear shelf when in the deployed position, the contact being assured by a guide device of the rear shelf or of the closure flaps respectively, and the guide device is configured to guide the closure flaps or the rear shelf respectively.

8. A vehicle equipped with a roof device according to claim 1, wherein motive energy used to actuate the closure flaps is furnished by an actuating mechanism shared with the guide.

9. The device according to claim 1, wherein the cable is a bicycle-brake type.

10. The device according to claim 1, further comprising:
a rear shelf; and
a mechanical cable,
wherein the mechanical cable transmits a force to fold down the rear shelf after the closure flaps have been automatically actuated toward the deployed position.

11. The device according to claim 10, wherein the mechanical cable is of a bicycle-brake type and the force is generated from a closing mechanism of a trunk door.

* * * * *